March 11, 1930. O. G. STEINITZ 1,749,927
SIGNALING RECORDER
Filed March 8, 1927 7 Sheets-Sheet 1

INVENTOR
Oswald G. Steinitz
BY
M. C. Frank
ATTORNEY

March 11, 1930. O. G. STEINITZ 1,749,927
SIGNALING RECORDER
Filed March 8, 1927    7 Sheets-Sheet 3

INVENTOR
Oswald G. Steinitz
BY M. C. Frank
ATTORNEY

March 11, 1930.  O. G. STEINITZ  1,749,927
SIGNALING RECORDER
Filed March 8, 1927  7 Sheets-Sheet 4

INVENTOR.
Oswald G. Steinitz
BY M. C. Frank
ATTORNEY.

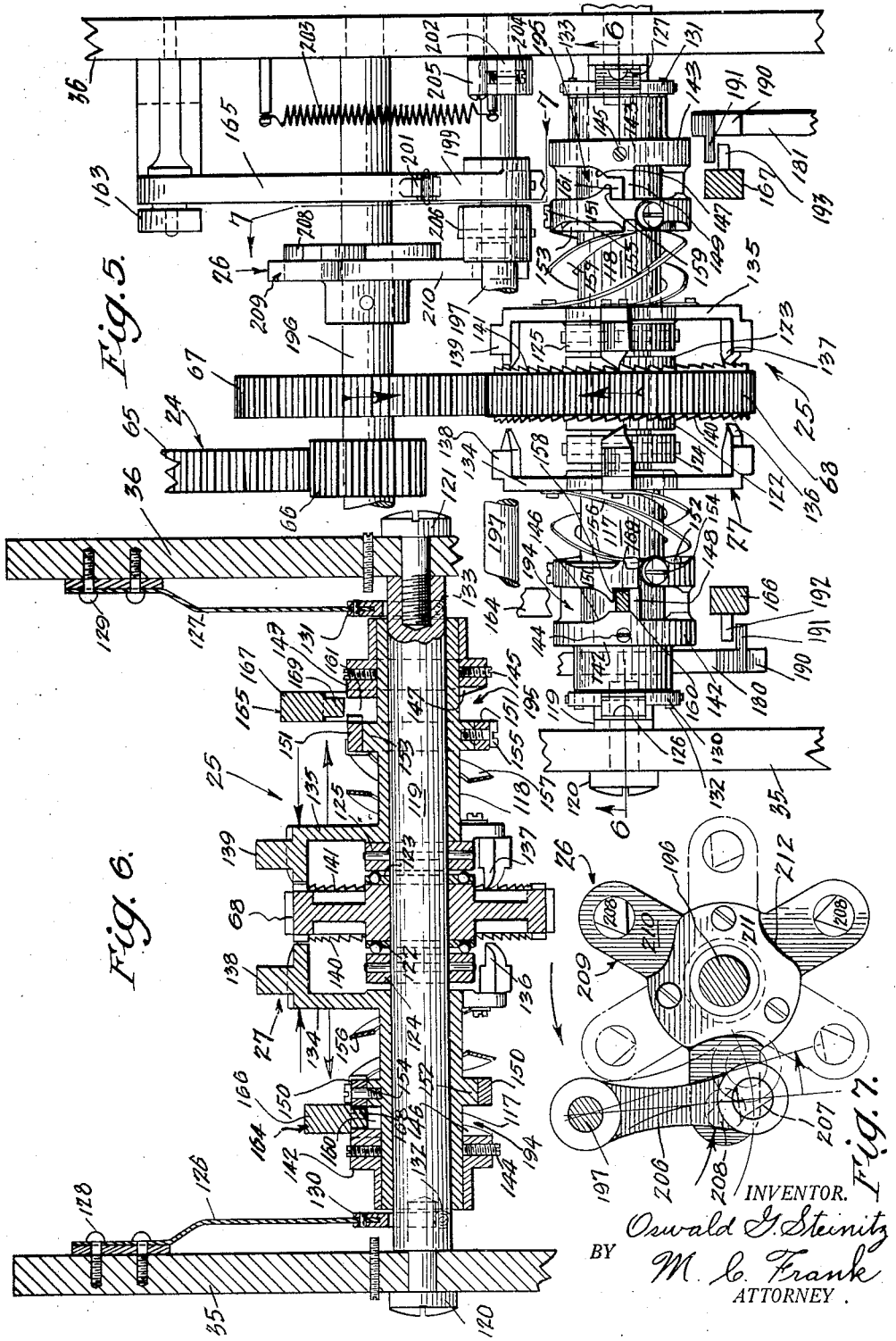

March 11, 1930.  O. G. STEINITZ  1,749,927
SIGNALING RECORDER
Filed March 8, 1927    7 Sheets-Sheet 6
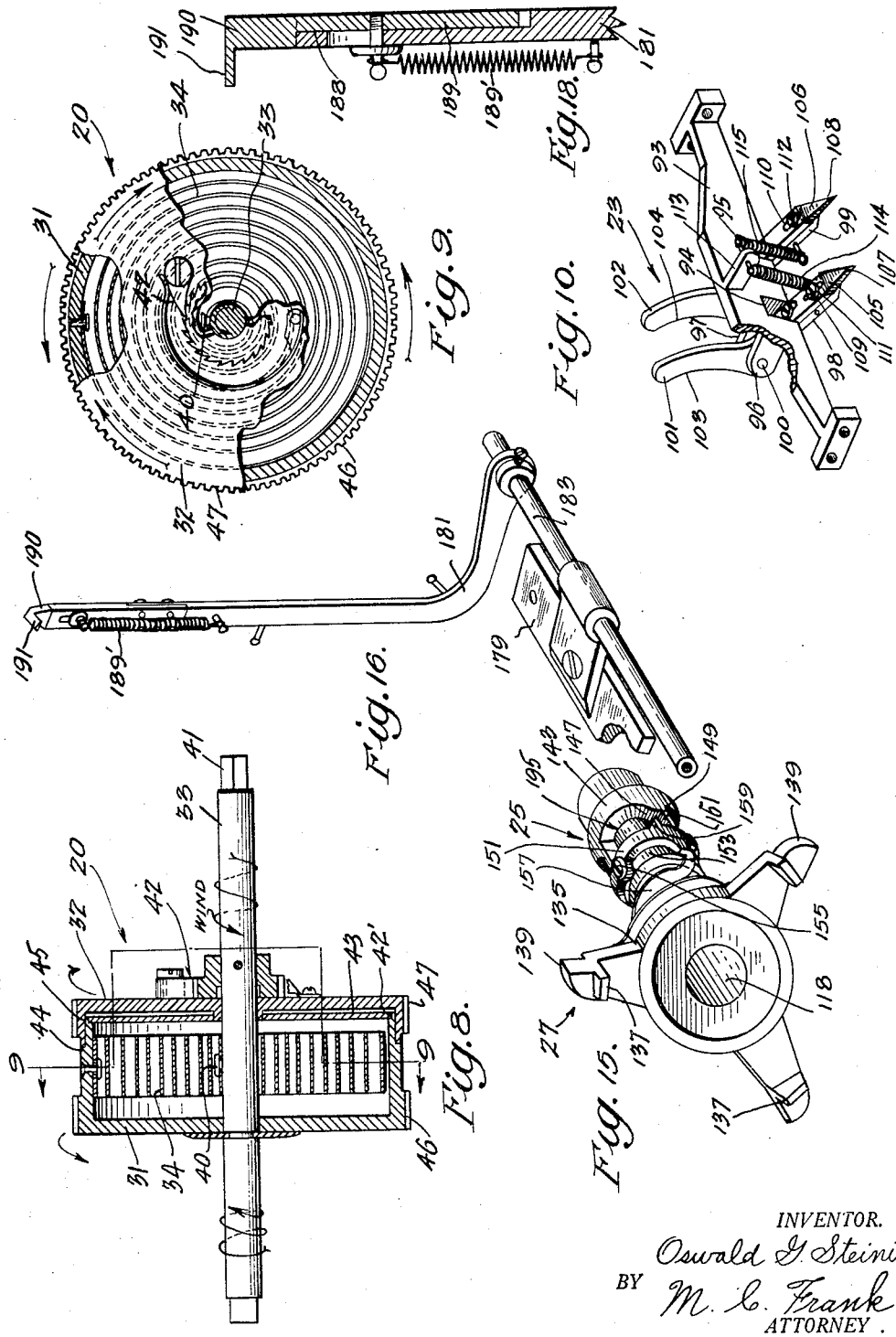
INVENTOR.
Oswald G. Steinitz
BY M. C. Frank
ATTORNEY.

March 11, 1930.  O. G. STEINITZ  1,749,927
SIGNALING RECORDER
Filed March 8, 1927  7 Sheets-Sheet 7
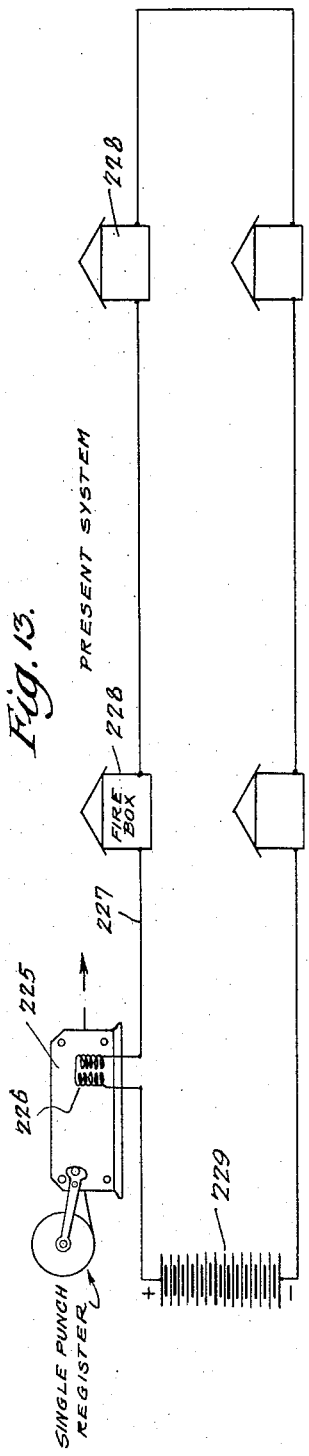
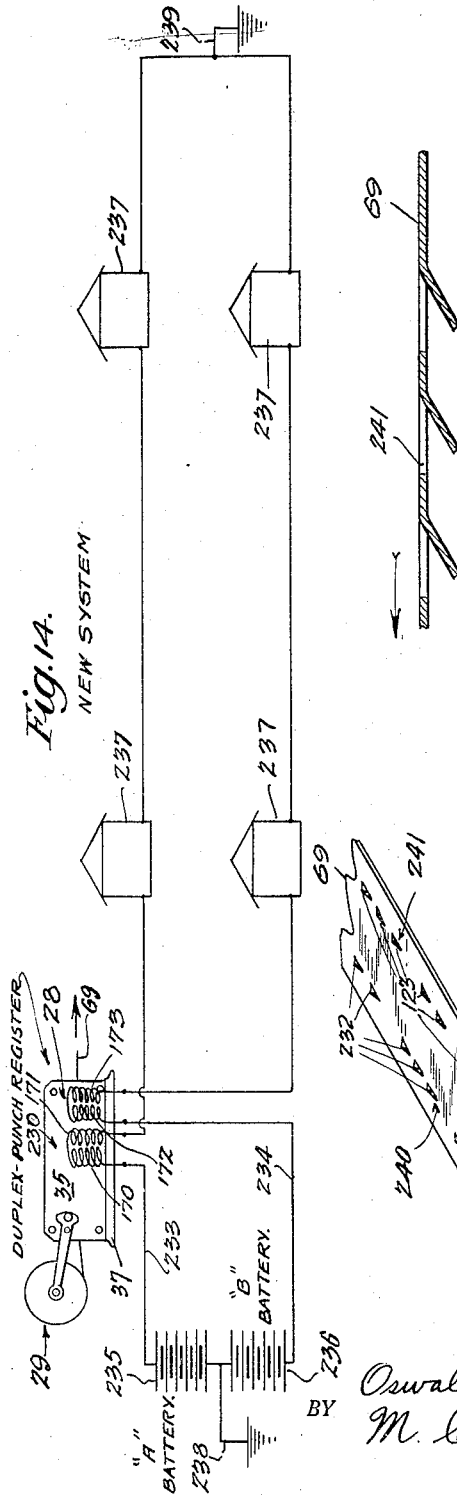
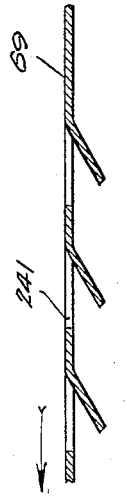
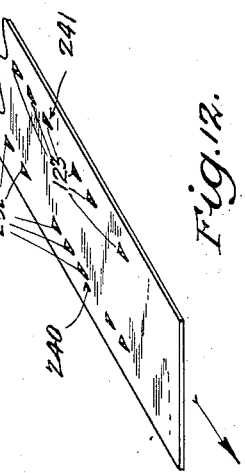
INVENTOR.
Oswald G. Steinitz
BY M. C. Frank
ATTORNEY.

Patented Mar. 11, 1930

1,749,927

UNITED STATES PATENT OFFICE

OSWALD G. STEINITZ, OF BERKELEY, CALIFORNIA

SIGNALING RECORDER

Application filed March 8, 1927. Serial No. 173,688.

This invention relates broadly to improvements in signaling systems, but more particularly to electro-mechanical apparatus for recording signals upon a moving tape, as transmitted thereto from remote stations, such as the fire alarm boxes of an ordinary fire signaling system, or police signaling system.

There are at the present time various types of recording apparatus in use primarily designed to record signals transmitted from remote stations to a central station; among these being the so-called multiple tape register, in which the signals received are imprinted upon a moving tape by ink stamps, or similar imprinting means. These systems are used chiefly because of the facility with which the stamps can be impressed upon the tape by a direct magnetic pull. Other forms of recording apparatus include a tape-perforating mechanism which perforates the moving tape with a single line of perforations indicating one set of signals, but this type of apparatus ordinarily requires the use of relays, thus making it impossible to use such an apparatus directly in low current circuits.

The decided advantage in the use of a register having an electro-mechanical duplex-punching mechanism constructed in accordance with my invention is that it permits the successful operation of a fire alarm system on a single or common battery circuit. The prevalent method is to have two individual batteries, insulated from the ground, for each circuit of the system. These batteries are alternately charged and alternately connected to the line, which is a closed metallic circuit. In many installations of this type, there are often from fifty to one hundred circuits, each having two batteries, which results in a very large number of small capacity battery cells. Such a large number of batteries composed of many individual cells requires that they be installed in iron or wooden frames in tiers and their installation and upkeep is consequently exceedingly expensive. All fire alarm system circuits are subject to more or less trouble, due to battery leakage, fumes from the acid, and "creepage", and, therefore, require considerable care and maintenance work.

By the use of a register having an electro-mechanical duplex-punching mechanism constructed in accordance with my invention it is possible to obviate many of the above-enumerated troubles, as the present system requires the use of but a single battery; thus greatly reducing the cost of installation and the liability of damage to a minimum.

A further distinct advantage in the use of a register having a duplex-punching mechanism is the fact that it can be used in the prevalent system as a receiving device for two separate circuits, in such installations where it is desirable to reduce the number of registers due to lack of space, or for any other reasons. Ordinarily this is accomplished by installing a sensitive relay in the fire alarm circuit main line, which relay operates a register having a punching mechanism through a local circuit and a local battery. The above type of register punching-mechanism is operated by direct magnetic pull and the operating current of the ordinary fire alarm circuit is too weak for its operation and the extra devices are, therefore, necessary.

In the installation of the present register including an improved duplex-punching mechanism, it can be cut directly into the circuit as it will operate through all fluctuations of the line current and will thus avoid the installation and maintenance of the relay, the local battery and local circuit as above described. It is also possible to use the present register in two entirely disassociated circuits of different types, for the reason that one punch of the duplex-punching mechanism may be operated in a closed circuit and the other punch may be simultaneously operated in an open circuit.

One of the important objects of my invention is to provide a register which employs a duplex-punching mechanism adapted to simultaneously record upon the moving tape, either two sets of like signals, or two sets of different signals which may be received from the same signal box or from remote signal boxes.

Another important object is to provide a register punching-mechanism which accomplishes reliable and positive perforation of the tape within the current limits usually prescribed for fire alarm and police signal circuits, and which are usually operated on a current of 1/10 ampere (100 milliamperes).

Another object of my invention is to provide a register having a duplex-punching mechanism which can be operated directly in a low current circuit.

Another object is to provide a register having a single actuating spring adapted to operate both the paper-feed mechanism and the punching-mechanism, when tripped by magnetically-controlled means adapted for cooperative action therewith.

An additional object is to provide a register having a duplex-punching mechanism with punches that are adapted to be operated in synchronism by electro-magnetic means connected to both sides of a normally closed circuit; or operated independently of each other when the magnets are connected in separate closed circuits, or when both are connected in separate open circuits, or with one magnet connected in a separate open circuit and the other connected in a separate closed circuit.

Still another object of the invention is to provide a register having a duplex-punching mechanism which is directly actuated by a hammer blow transmitted thereto by the main actuating spring, the principal function of the electro-magnets being to merely cause the simultaneous or independent functioning of the hammer-mechanisms to cause their mechanical contact with the punches.

Additional to the foregoing is the provision of a punching mechanism which employs novel clutch means adapted to function to cause its hammers to transmit sharp blows to the punches, and which hammer blows are accentuated by the momentum gained by the hammers when released by the electro-magnets and primarily due to the spring urge of the main actuating spring.

The invention also comprises various other novel features of construction and combinations and arrangements of parts, all as hereinafter described and pointed out in the claims.

In the accompanying drawings illustrative of the invention:

Figure 1 is a side elevation illustrating the register per se and showing the relative arrangement of its correlated mechanisms and gear trains; the tape feed-reel is shown in position to feed the tape to the register, and the electro-magnets that function to release the several mechanisms are shown mounted in the base near the forward end of the device, a portion of the side plate of the apparatus being broken away to illustrate interiorly positioned parts;

Figure 5 is an enlarged fragmentary plan view illustrating the clutch means which causes the selective or the simultaneous actuation of the punches, also the correlated drum-releasing mechanism;

Figure 6 is a sectional detail taken through the clutch and shows the method of mounting the duplex-hammers on opposite sides of the clutch gear with which they are adapted to contact either selectively or simultaneously to cause corresponding hammer-blows to be imparted to the punches;

Figure 7 is a detail view illustrating a porton of the drum-releasing mechanism which functions to trip the spring-actuated drum in proper sequence;

Figure 8 is a sectional detail view illustrating the spring drum for actuating the gear trains;

Figure 9 is a sectional detail of the same taken on the line 9—9 of Figure 8;

Figure 10 is a perspective view of the duplex tape punches and their supporting yoke;

Figure 11 is a perspective view of the stop-mechanism for regulating the tape-feed gear train;

Figure 12 is a perspective view of a portion of the tape showing a double row of perforations and illustrates two different sets of signals;

Figure 13 is a wiring diagram illustrating the old system of connecting a single punching register in a fire alarm circuit;

Figure 14 is a wiring diagram illustrating the method of connecting the present duplex-punching register in a fire alarm circuit;

Figure 15 is a perspective view of the right-hand hammer mechanism and its clutch collar;

Figure 16 is a perspective view of the right-hand magnet armature and its L-shaped tripping arm.

Figure 17 is an enlarged sectional detail showing a portion of the tape after it has been perforated by the punch-mechanism; and Figure 18 is an enlarged sectional detail of the upper end of the L-shaped arm shown in Figure 16.

Figure 1:
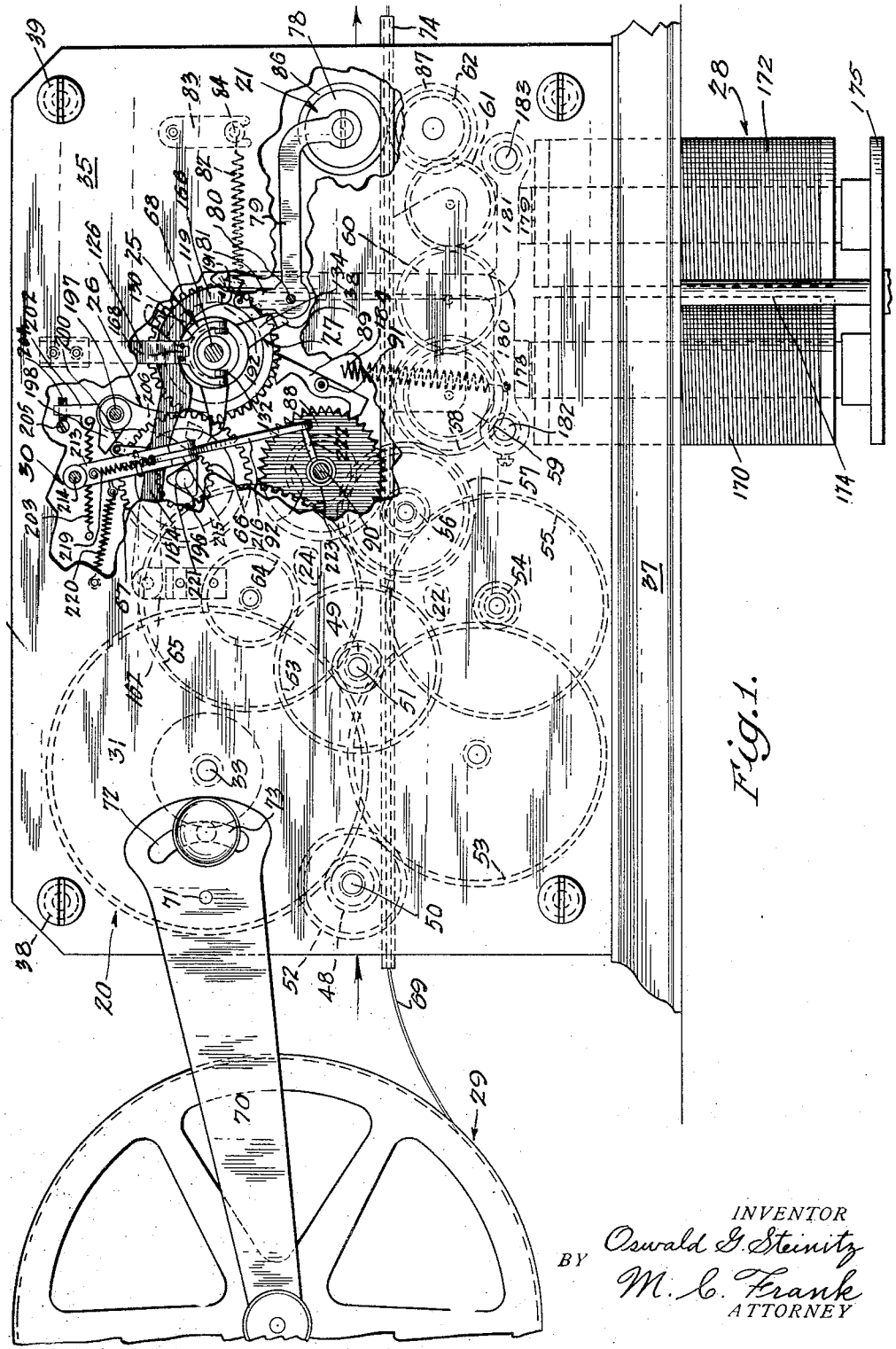

The predominant feature of my invention is the register per se including the duplex-punching mechanism and its correlated actuating mechanisms, and various novel arrangements and combinations of parts that will be hereinafter more fully described.

Referring with greater particularity to the drawings in which the preferred embodiment of my invention has been shown, I will first refer, in a general way, to the various mechanisms constituting my invention.

The numeral 20 designates the spring-actuating drum which functions to drive the various mechanisms, namely, the tape-feeding mechanism 21 which is driven through the medium of the gear train 22 and the punching mechanism 23 which is driven through the medium of the gear train 24, as hereinafter more fully defined.

The punching-mechanism 23 is coactively associated with the clutch mechanism 25, the actuating-drum tripping-mechanism 26, the revoluble hammer mechanisms 27, and the electro-magnetic controlling means 28.

The tape-feeding mechanism 21 includes the tape reel 29, gear train 22, and stop mechanism 30, all hereinafter more fully pointed out.

The spring-actuating drum 20 is so constructed that opposite sides thereof rotate in opposite directions to drive the gear trains 22 and 24 by means of a single spring. In detail, the actuating drum embodies annular sections 31 and 32 mounted upon a shaft 33 and forming a spring housing for the spring 34. The shaft 33 is mounted in bearings formed in the vertical side plates 35 and 36 which are carried by a base plate 37, the said plates being rigidly secured together by the spacing members 38 and 39 arranged between opposite upper corners of these plates 35 and 36.

Figure 3:
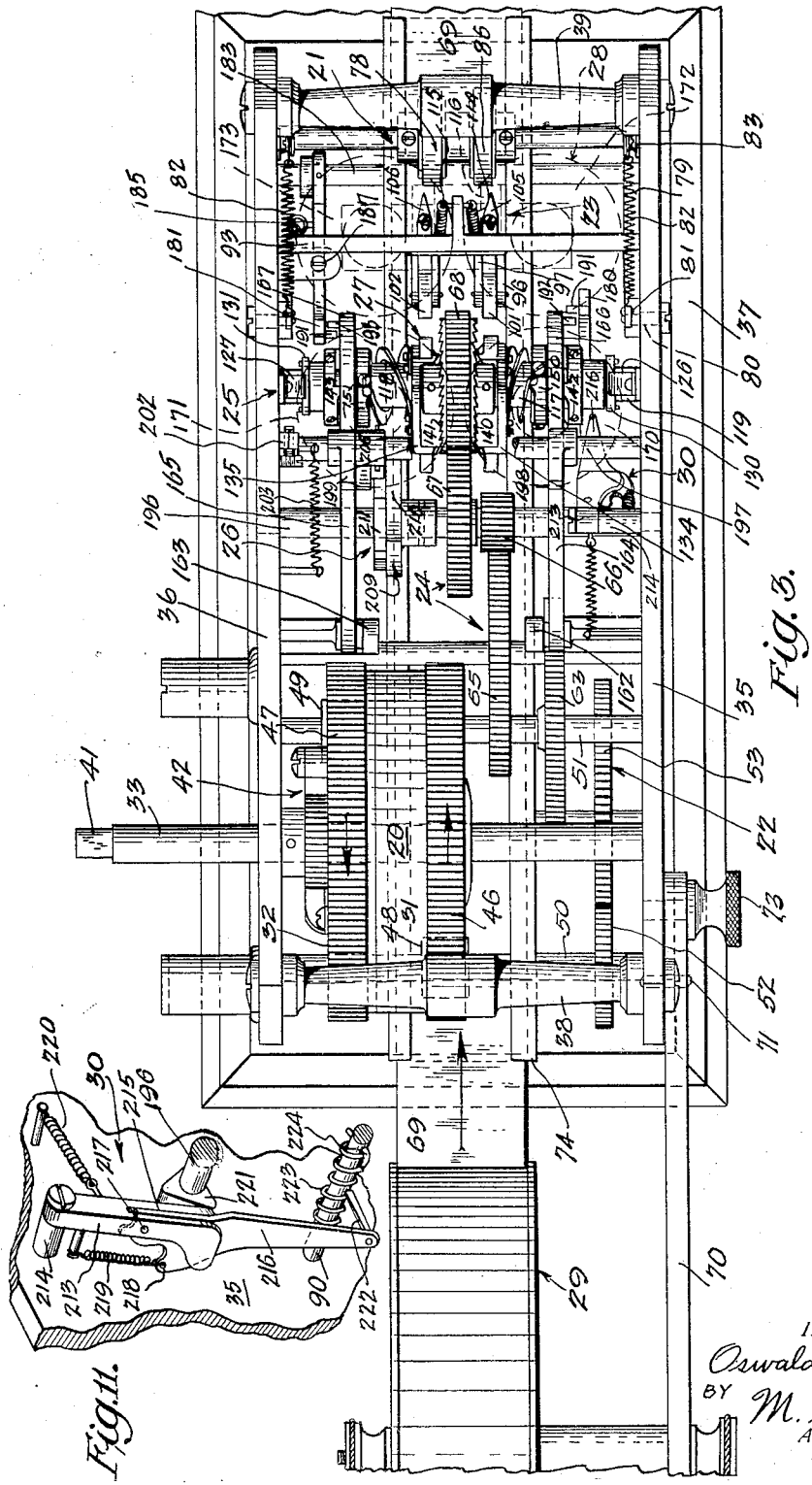
Figure 3 is a top plan view illustrating the general arrangement of the various mechanisms constituting the apparatus and in particular the tape-reel, the main actuating drum, tape-feed and punch-actuating gear trains, and the punch-actuating mechanism.

Referring to Figures 3, 8 and 9, which show the actuating drum in detail, it will be observed that the inner end of the spring 34 is secured to the shaft 33 by means of a pin 40 and its outer end secured to the interior wall of the section 31. The spring is wound in the direction indicated by the arrow in Figure 8 by means of a crank or key (not shown) which is inserted upon the outer squared end 41 of the shaft 33.

The section 32 floats upon the shaft 33 and is connected thereto by means of a pawl and ratchet 42, Figures 3, 8 and 9, so that the tendency will be for it to rotate in a contra-clockwise direction, as indicated by the arrow in Figures 3 and 9, caused by the urge of the spring 34 upon the shaft 33, while its companion section 31 will be urged in the opposite direction, Figure 3, or in a clockwise direction caused by the urge of said spring which tends to expand or unwind in said clockwise direction.

The section 31 is provided with an annular shoulder 42' formed in its open edge, and a disc 43 is fitted into this shoulder and forms a housing for the spring 34. The said section 31 is also provided with an exterior recess 44 providing an annular bearing surface adapted to receive the interiorly finished surface 45 of the section 32, so that each will provide bearing supports for the other and rotate in opposition to each other when released as hereinafter described.

The section 31 of the drum is provided with gear teeth 46, and the section 32 thereof is provided with corresponding gear teeth 47 adapted to mesh with pinions 48 and 49, respectively mounted upon shafts 50 and 51 carried by the side plates 35 and 36 of the device.

The shaft 50 which is connected to the drum section 31 drives the tape-feeding train 22 which consists of gears and pinions 48, 52, 53, 54, 55, 56, 57, 58, 59, 60 and 61 and the feed roller 62, and the shaft 51 which is connected to the actuating drum section 32 drives the correlated punch-actuating mechanisms through the medium of the train 24, which is constituted of the gears and pinions 49, 63, 64, 65, 66, 67 and 68.

The tape 69 is wound upon the reel 29 which is revolubly mounted upon an arm 70 pivotally arranged upon the plate 36 by means of a pivot 71, and is adjustable relative to said plate by means of an arcuate slot 72 and a set screw 73, as shown in Figures 1 and 3. The tape 69 is carried through the apparatus by means of a guide-way 74 which is mounted longitudinally thereof between the side plates and held in position by the supports 75 and 76, said guide-way is provided at the forward end with a slot 77 into which the feed roller 62 projects and engages the tape 69. A tensioning roller 78 is mounted above the roller 62 and the tape 69 passes between these rollers and is drawn outwardly in the direction of the arrow in Figures 1 and 2 by means of said roller 62.

The tensioning roller 78 is carried by a frame 79 pivotally mounted in the side plates 35 and 36 by means of pivots 80; the inner ends of said frame are provided with upstanding arms 81 connected by expansion springs 82, which are adjustably secured to the side plates by means of spring members 83 provided with lugs 84 at their lower ends through which the adjusting screws 85 extend. The tension of these springs upon the arms 81 tend to hold the tensioning roller 78 in frictional contact with the tape 69 and roller 62; both of these rollers being provided with rubber treads 86 and 87 as clearly shown in Figures 1 and 2.

The tape-feeding train 22 is controlled by means of an escapement wheel 88 and an escapement pawl 89 carried by the shafts 90 and 91 respectively; said shaft 90 also bears a pinion 92 which meshes with the gear 57 of the tape-feeding train, the escapement merely preventing the train from becoming too highly accelerated; said train being additionally controlled and stopped by means of the stop mechanism 30 as will be hereinafter explained.

The punch mechanism 23 is clearly shown in Figures 2, 3, 4 and 10, and consists of a supporting bar 93 which is rigidly mounted transversely between the plates 35 and 36 and is provided with adjacently-arranged slots 94 and 95 and rearwardly-projecting sets of lugs 96 and 97, between which the punch-bars 98 and 99 are pivotally mounted by the pins 100. These punch-bars are duplicates and are fashioned somewhat in the form of bell-cranks having upwardly projecting cam-members 101 and 102 provided with curved inner edges 103 and 104. The punch-bars 98 and 99 are angularly disposed and are provided with punches 105 and 106 having triangular shaped points 107 and 108; said punches being adjustably secured to the bars 98 and 99 by means of slots 109 and 110 and set screws 111 and 112. The front upper edge of the supporting bar 93 is provided with an outwardly projecting lug 113, which carries at its outer end a pair of tension springs 114 and 115 connected, respectively, at their lower ends to the inner edges of the punch-bars 98 and 99, the tendency of these springs being to keep the punches in retracted positions and out of contact with the tape. The lower ends of said punches are adapted to swing through openings 116 formed in the guide-way 74 for their reception when they are actuated to perforate the tape, and on account of their triangular shape and the angle at which they strike the tape, leave triangularly-shaped tangs on the underside thereof which requires considerably less power for their actuation than punches which completely perforate the tape.

The clutch mechanism 25 consists of the left and right-hand hammer mechanisms 27, which are provided with oppositely disposed sleeves 117 and 118 slidably mounted upon the rigid shaft 119 which is connected to the side plates 35 and 36 by means of screws 120 and 121. The gear 68 is mounted intermediate the hammer mechanisms 27, and is loosely carried by the shaft 119 and held in place thereon by means of oppositely disposed thrust bearings 122 and 123, and which latter are secured in place by collars 124 and 125 rigidly pinned to the shaft as clearly shown in Figure 6.

The sleeves 117 and 118 are slidable laterally upon the shaft 119, and are normally urged inwardly by means of the spring members 126 and 127 rigidly secured to the inner surfaces of the plates 35 and 36 by screws 128 and 129; said spring members are provided at their lower ends with yokes 130 and 131, which embrace the ends of the shaft 119 and are provided at their extremities with sets of rollers 132 and 133 adapted to contact and urge the sleeves 117 and 118 of the hammer mechanisms 27 toward each other and the gear 68.

The hammer mechanisms 27 are provided with radially arranged arms 134 and 135, preferably three in number, which carry at their outer ends inwardly projecting pawl members 136 and 137 provided with a plurality of hammers 138 and 139 having rounded ends adapted to contact the curved surfaces 103 and 104 of the cams 101 and 102 of the punches.

The gear 68 is provided with annularly arranged ratchet teeth 140 and 141 formed on opposite side edges thereof, and which teeth are adapted to be simultaneously or selectively engaged by the pawl members 136 and 137 of the hammer mechanisms; said ratchet teeth being arranged to function in the same common direction as shown in Figures 5 and 6 to rotate the hammer mechanisms 27 in the direction of the arrow shown upon the gear 68, or when said gear is rotated in a contra-clockwise direction by the gear 67 with which it constantly meshes.

The hammer-mechanism sleeves 117 and 118 are provided at their outer ends with clutch collars 142 and 143, Figures 5 and 6, which are secured thereto by means of set screws 144 and 145 and are adapted for slight lateral movement upon the shaft 119 as units. These clutch collars 142 and 143 are clearly shown in Figures 5 and 15 and are of similar but right and left hand construction, each being provided with three radially positioned cam surfaces 146 and 147 terminating in inwardly projecting lugs 148 and 149; each of said lugs are adapted to contact the side edges of one of a like number of arcuate pawls 150 and 151; the pawls are adapted to embrace shoulders 152 and 153 formed upon the sleeves 117 and 118 and to which they are pivotally secured by means of screws 154 and 155 for accomplishing a lateral swinging movement toward the gear 68. Flat helicoidal springs 156 and 157 are positioned about the sleeves 117 and 118 and interposed between the pawls 150, 151 and the hammer arms 134 and 135, and have their inner extremities secured to said arms and which tend to urge the pawls 150 and 151 toward the lugs 148 and 149 of the clutch collars 142 and 143. The extremities of the pawls 150 and 151 are notched out as indicated at 158 and 159 and form, when in contact with the lugs 148 and 149 of the clutch collars, rectangular openings 160 and 161 as clearly shown in Figure 5.

The plates 35 and 36 are provided with a pair of oppositely disposed bearing brackets 162 and 163 mounted considerably in the rear of the shaft 119 and slightly thereabove, said bearing brackets forming pivotal points for the inner ends of a pair of clutch-engaging levers 164 and 165, shown in Figures 1, 2, 3, 4, and 6. These levers are provided at their outer ends with arcuate yokes 166 and 167, each having a centrally disposed clutch-engaging tooth 168 and 169 adapted to normally engage the rectangular openings 160 and 161 formed by the clutch collars 142 and 143 and the pawls 150 and 151, said levers 164 and 165 being held in engaged position by spring means hereinafter described.

Figure 2:
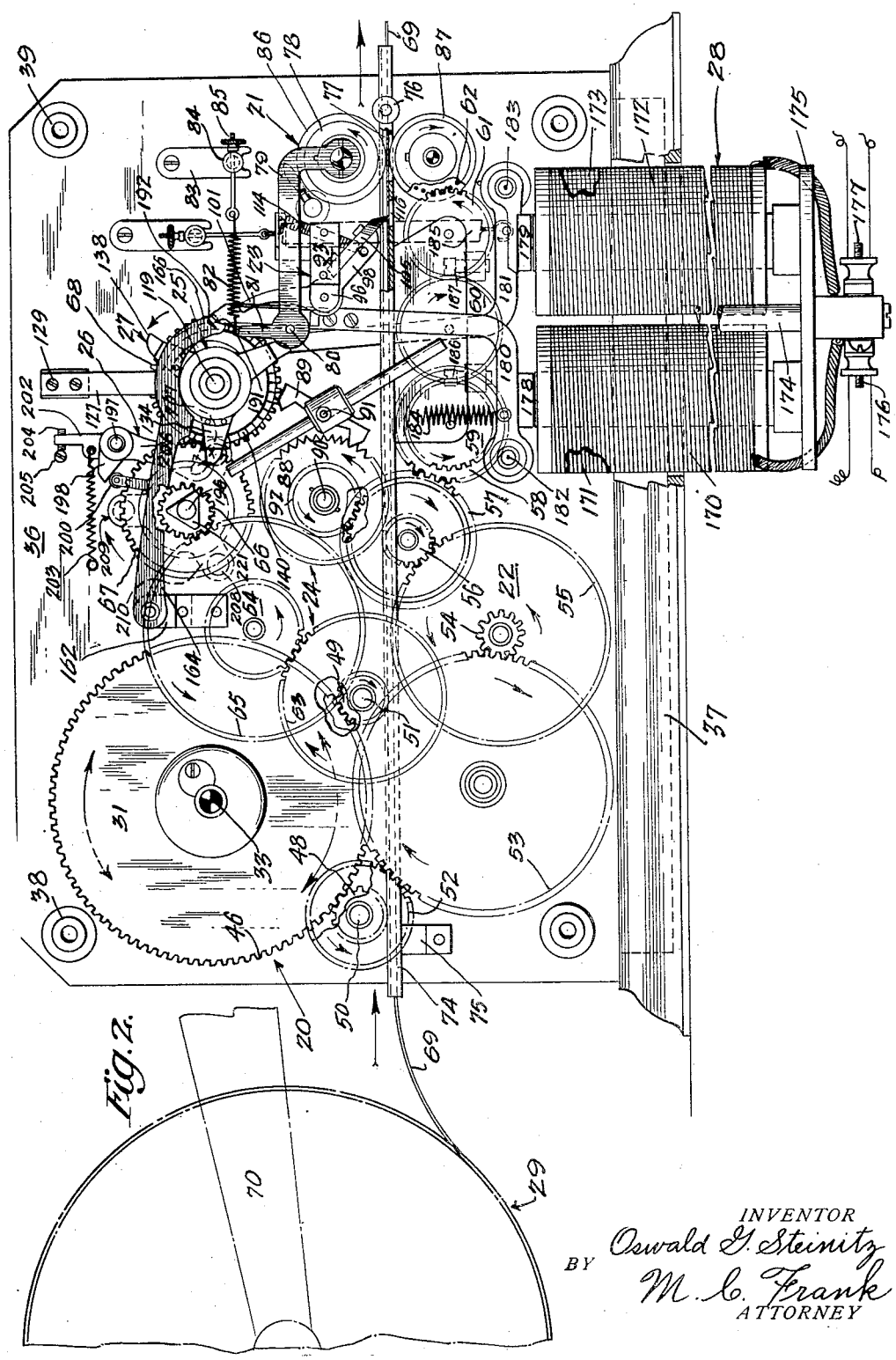
Figure 2 is a side elevaton showing the register as it would appear with one of its side plates removed, and illustrates the main actuating drum which is connected to the tape-feeding gear train and the punch-actuating gear train, the various correlated mechanisms being shown in a state of rest and in which position the electro-magnets are normally energized.

The electro-magnetic controlling means 28 consists of a plurality of electro-magnets 170, 171, 172 and 173 arranged in pairs and mounted below the base as shown in Figures 1 and 2, said magnets being positioned near the front end of the device and rigidly secured to the base by means of a pair of supporting rods 174 and a bottom plate 175; the latter carries the binding posts 176 and 177 to which the line wires are connected. The magnets project above the base 37 of the apparatus, and the cores of the magnets 170 and 171 are arranged in vertical parallelism as are the cores of the magnets 172 and 173.

The armatures 178 and 179 of the respective sets of magnets 170, 171, 172 and 173 are arranged transversely between the side plates 35 and 36, as shown in Figures 1 and 2, and are carried by a pair of L-shaped tripping arms 180 and 181 rigidly mounted upon rock shafts 182 and 183, which latter are carried by pivot bearings mounted in the said side plates.

Adjustable set-screw stops 186 and 187 are mounted on the side plates and are adjusted to engage the upper edges of the arms 180 and 181, to gauge their upward swinging movement upon their bearings when the armatures 178 and 179 are released by the magnets. These arms extend upwardly and terminate adjacent the outer ends of the yokes 166 and 167 of the levers 164 and 165 and swing directly thereunder in opposite directions. Each of these L-shaped arms are identical in construction and function in the same manner, except that they are made for right and left-hand sides of the device, the right-hand one being shown in detail in Figures 16 and 18 and to which I will particularly refer. The upper ends of these arms are provided with guide-ways 188 in which are mounted vertically-movable bars 189, having formed at their upper ends substantially triangularly-shaped heads 190 provided with inwardly projecting and angularly disposed tangs 191, which are positioned to slide under and return over correspondingly disposed tangs 192 and 193 carried by the outer sides of the extremities of the yokes 166 and 167 of the levers 164 and 165, as shown in Figures 3 and 4.

The vertically-movable bars 189 are provided with inwardly-projecting pins and to which are secured small coil springs 189', which latter are attached at their lower ends to pins projecting from the arms 180 and 181, said springs tending to normally retain the heads 190 seated upon the ends of the arms, but to allow of their vertical movement caused by the return of said arms and the consequent reengagement of the tangs 191 thereof in passing over the tangs 192 and 193 to their normal positions, said tangs 191, as hereinafter explained, being adapted to pass under the tangs 192 and 193 to cause the disengagement of the levers 164 and 165 from the clutch mechanism. Said tangs 191 carried by the arms 180 and 181, are adapted, when the magnets are energized, to lie immediately adjacent the tangs 192 and 193, and, when said magnets are deenergized, to contact said tangs 192 and 193 to raise the levers 164 and 165. This movement causes the disengagement of the teeth 168 and 169 of said levers, from the openings 160 and 161 formed by the clutch collars, and the immediate inward movement of the hammer-mechanism sleeves 117 and 118 and the engagement of their respective pawls 136 and 137 with the ratchet teeth 140 and 141 of the gear 68. This inward movement of the sleeves 117 and 118 is accomplished by the urge transmitted thereto through the action of the spring members 126 and 127 which contact the outer edges thereof as hereinbefore explained.

The above described engagement of the hammer mechanism pawls 136 and 137 with the gear ratchet teeth 140 and 141, instantaneously locks these mechanisms together and causes the rotation of said mechanisms at high velocity throughout one-third of a revolution, and in turn causes their lowermost respective hammers 138 and 139 to contact the curved edges 103 and 104 of the arms 101 and 102 of the punches to transmit sharp hammer blows thereto, which blows are in turn transmitted to the punches 105 and 106 and which latter perforate the tape and then immediately return to their normal retracted positions.

Figure 4:
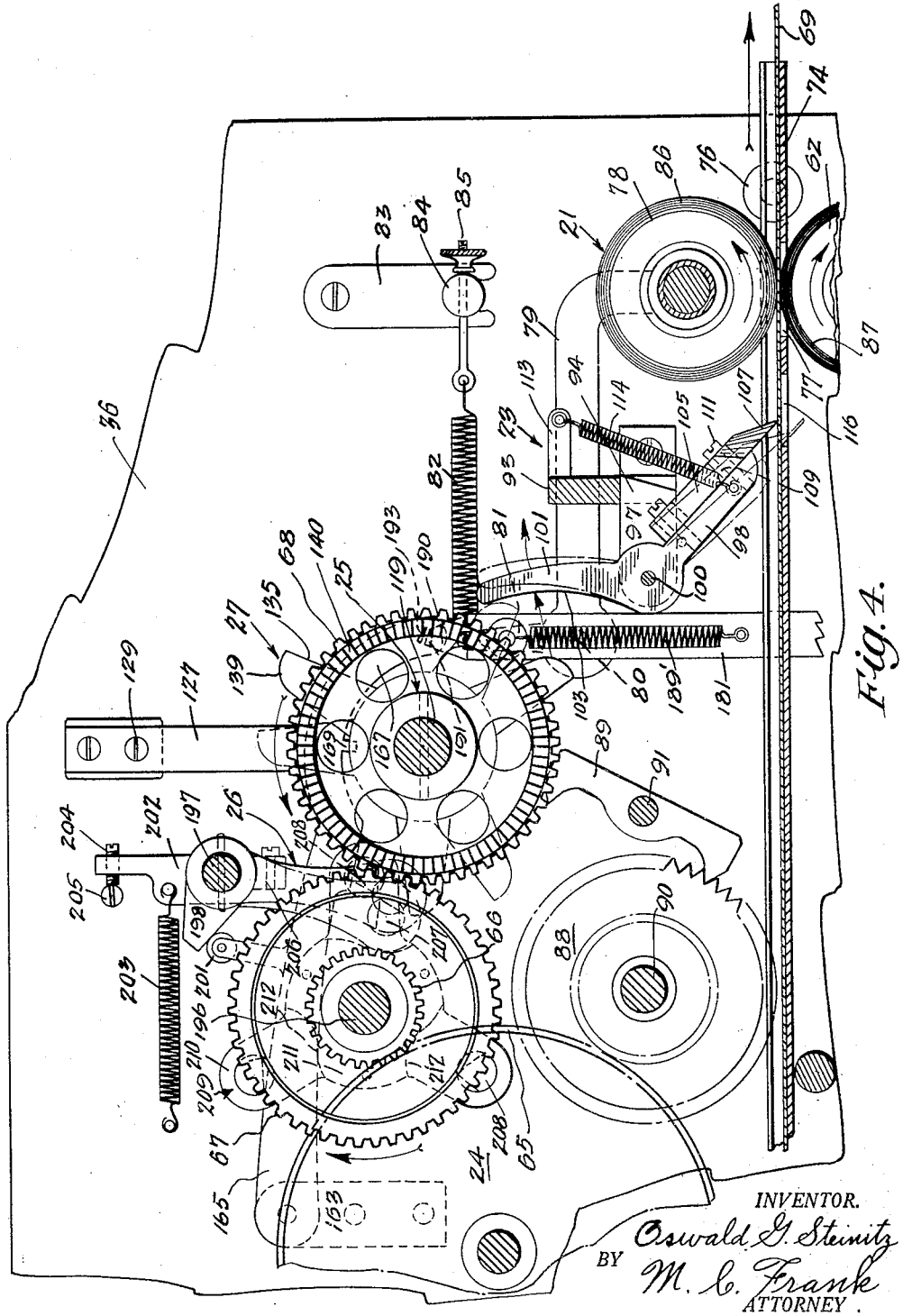
Figure 4 is a considerably enlarged fragmentary detail view illustrating the punch-mechanism and correlated parts, the dot-and-dash positions illustrating the actuating movements of the several mechanisms, and the full line positions illustrating their positions when at rest.

The hammers 138 and 139 are in engagement with the punch arms 101 and 102 but a fraction of a second, but when they strike said arms 101 and 102 they are highly accelerated by reason of having gained considerable momentum before coming into contact therewith, due to their spacing and construction as shown in Figure 4.

The interim between the release of the teeth 168 and 169 of the levers 164 and 165 and their re-engagement with the next succeeding clutch openings 160 and 161, is of course, very slight; these teeth immediately upon their release from said clutch openings, tend to idle in the slots 194 and 195 formed between the clutch collars 142 and 143 and the shoulders 152 and 153, until the next succeeding cam surfaces 146 and 147 of the clutch collars come into contact with said teeth 168 and 169, whereupon the clutch collars and sleeves 117 and 118 are forced outwardly against the tension of the spring members 126 and 127, and the teeth are again dropped into locking engagement with the clutch openings 160 and 161, which movement simultaneously disengages the pawls 136 and 137 from the ratchet teeth 140 and 141 of the hammer mechanisms, and locks them against further rotation until their next succeeding engagement caused by the release of the clutches, as shown in Figure 5.

The gear 67 is rigidly mounted upon a shaft 196 located in the rear of shaft 119 and is journalled in the side plates 35 and 36, said shaft is connected to the punch-actuating gear train 24 by the pinion 66 and the spring-actuating drum section 32 is connected to this train and tends to normally urge the shaft 196 in a clock-wise direction.

The clutch tripping mechanism 26 embodies a rock-shaft 197, which is mounted in the side plates above and intermediate of the shafts 119 and 196, Figure 4, said shaft extends above the levers 164 and 165 and has cam members 198 and 199 positioned directly above said levers and is adapted to normally engage idler rollers 200 and 201 carried by the levers 164 and 165 respectively.

These cams 198 and 199 are pinned to the shaft 197 and are urged against the rollers 200 and 201 by means of an arm 202 and coil spring 203, the throw of said arm being adjusted by means of a set screw 204 mounted near the upper end of said arm and adapted to engage a stop pin 205 carried by the side plate 36. The coil spring 203 and cams 198 and 199 tend to hold the levers 164 and 165 down and with their teeth 168 and 169 in engagement with the clutch collars 142 and 143.

The shaft 197 is additionally provided with a stop link 206, Figures 1, 2, 4, and 7, which is pinned thereto and extends downwardly and angularly toward the shaft 195 and is provided at its lower end with a triangular shaped lug 207 adapted to extend into the path of a plurality of like lugs 208, carried by the member 209 which is mounted upon the shaft 196, Figures 5 and 7.

The tendency of the actuating-drum section 32 is to rotate the member 209 in a clockwise direction, but the stop link lug 207 normally engages one of the lugs 208 arranged on the radial arms 210 of said member 209 and prevents such rotation, until the link 206 is rocked rearwardly by the manipulation of shaft 197 caused by the tripping of levers 164 and 165, or, by the breaking of the circuit.

This tripping movement of the levers 164 and 165 allows said member 209 to rotate a one-third revolution until the next lug 208 contacts the lug 207 of the stop link; said link being immediately returned to its normal position by being swung back into the path of the lugs 208 by the spring 203 and the cam member 211; said cam member is mounted upon one face of the member 209 and has notches 212 formed in its edges in which the rounded end of the stop link engages when said link is swung inwardly toward the shaft 196, Figure 7, and said cam member tends to force said link outwardly as the member 209 rotates.

It will be noted from the foregoing description that the mechanism 26 taken as a whole, normally locks the spring-actuating drum section 32 against rotation and only releases said section 32 to drive the clutch and punch mechanisms, through the medium of the gears 67 and 68, when the hammer mechanisms 27 are simultaneously or selectively moved into engagement with the gear 68, by the functioning of the levers 164 and 165 caused by the simultaneous deenergization or the selective deenergization of the magnets as the case may be.

Of course either punch may be actuated independently of the other by the selective deenergization of the sets of magnets, as each set is arranged in a different circuit as hereinafter described.

The tape-feeding gear train 22 is actuated to simultaneously feed the tape, when the punches are functioning, by means of the stop mechanism 30 Figures 1 and 11. Said mechanism consists of a lever 213 adapted to rock upon a pin 214 mounted upon the side plate 35 of the apparatus, said lever being bifurcated at its lower end 215 and having a second laterally movable lever 216 pivotally secured therein by the pin 217; the inner upper edge of said lever 216 has an ear 218 to which one end of a coil spring 219 is secured, the upper end of said spring being secured to a pin carried by the lever 213, and the urge of said spring 219 tends to hold the lever 216 toward the plate 35. A spring 220 secured to the rear side of the lever 213 tends to hold said lever in contact with a triangular shaped cam 221 carried by one end of the shaft 196.

The lower end of the lever 216 is provided with a rearwardly projecting pin 222 flattened on its sides to form a chisel edge adapted to contact and move along the surface of the shaft 90, which carries the escapement wheel 88, said shaft being provided with a helical spring 223 wound tightly thereon and held in place by a pin 224. Normally the pin 222 will be positioned against the stop pin 224, having been carried along the shaft 91 by the helical spring 223 until said pin 224 has been engaged and which prevents rotation of the shaft 91 and tape-feeding gear train 22, but when either of the sets of magnets are deenergized and the shaft 196 rotated, the cam 221 forces the lever 213 away from the shaft 196 and causes the disengagement of pin 222 and the consequent return of the lever 216 to the opposite end of spring 223 where the pin again engages the spring, but is continuously vibrated by the cam 221 as long as the shaft 196 is rotated. When the shaft 196 is stopped by the mechanism 26, the pin 222 will travel outwardly toward the stop 224 until it again becomes engaged therewith and which prevents the continued rotation of the shaft 91 and stops the tape-feeding train 22.

In Figures 13 and 14 I have shown a diagrammatic layout representing the old and the new methods of connecting a register into a fire alarm circuit.

The register 225 shown in Figure 13 illustrates the method of connecting a single-punch register having a single electro-magnet 226 in a fire alarm circuit 227, which includes a series of fire alarm boxes 228 and the batteries 229. This method is the prevalent one and a register connected up in this manner can receive and record only a single set of signals upon the tape as it moves through the device.

In Figure 14 I have shown the preferred method of connecting my register 230 in a fire alarm circuit in which the two sets of electro-magnets 171, 172 and 173, 174 are connected independently of each other in a circuit 233, 234, which includes an "A" and "B" battery 235 and 236 and a plurality of fire alarm boxes 237, any of which may be "pulled" to break a magnet circuit 233 or 234, to cause the deenergization of the electro-magnets therein to release their respective armatures and cause the functioning of the punch-mechanism and correlated mechanisms to feed and perforate the tape.

The alarm circuit is grounded as indicated at 238 and 239 so that either side 233 or 234 will function if one side should get out of order.

In Figure 12 I have shown a fragment of the tape 69 which has been perforated with two rows of perforations 240 and 241 indicating two remote box numbers, or districts, upon the same tape which may be recorded simultaneously by the use of my improved duplex-punching mechanism.

This method of incorporating two batteries in a common battery fire alarm system is explained as follows:

Ordinarily, the second battery is merely used as an "emergency battery" or "stand-by battery" to be used only in cases of emergency due to line trouble. In the event of a ground on the outside, the system may be used as a three-wire system with a common return, as shown in Figure 14. It is, of course, to be understood that the diagram merely shows one circuit, but in practice all the circuits in such a system are arranged to operate in multiple from one common battery.

In recapitulation:

Assuming that a fire alarm box in the system has been "pulled" and one of the magnets deenergized by the temporary breaking of the magnet circuit, and assuming this box number to be "123" as shown on the right-hand side of Figure 12 and represented by the numeral 241, the armature 179 thereof is released and the tripping arm 181 swings upon its shaft 183, which swinging movement causes its tang 191 to engage under the tang 193 of the lever 165 and trips this lever upwardly and raises its tooth 169 out of engagement with the right-hand clutch slot 161. This releasing of the clutch 143 allows of its inward movement together with the sleeve 118 and its correlated hammer-mechanism, and the consequent engagement of the hammer-mechanism pawls 137 with the ratchet teeth 141 of the gear 68, which movement locks the right-hand hammer mechanism together with said gear 68, and in which position said hammer-mechanism is rotated throughout one-third of a revolution of the gear 68, and at which point the next succeeding clutch opening 161 is engaged by the pin 169 and the sleeve 118 is again pulled outwardly, as hereinbefore explained, and releases the pawls 137 of the hammer-mechanism from the ratchet teeth 141 of the gear 68.

The raising of lever 165 to cause the above-described engagement of the hammer-mechanism with the gear 68, simultaneously causes the rocking of shaft 197 through the medium of the rollers 200 and 201 and the cams 198 and 199, which rocking movement swings the link 206 inwardly toward the shaft 196 and releases member 209 for rotation which allows the gear 67 to rotate a one-third revolution in a clockwise direction and causes the rotation of gear 68, with which it meshes throughout, through a corresponding arc in a contra-clockwise direction, and thus causing the functioning of the engaged hammer-mechanism as described.

The above described contra-clockwise movement of the hammer-mechanism causes one of its hammers 139 to transmit a blow to the cam member 102, which blow is finally transmitted to the punch 106 and causes it to perforate the tape with a single perforation. This operation is substantially instantaneous and is repeated each time the circuit is broken to record upon the tape one numeral of the box number being transmitted. Both hammer-mechanisms may function simultaneously to record different box numbers upon opposite side edges of the tape as hereinbefore explained.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, I claim as new and desire to secure by Letters Patent of the United States the following:

1. A recording apparatus of the type described, including in combination, an actuating-drum, gear trains actuated thereby, a punch-mechanism including independently operable punches and a tape-feeding mechanism, said gear trains operatively connecting said mechanisms for their simultaneous operation, a clutch mechanism coactively associated with said punch-mechanism and providing means for the selective or simultaneous actuation of its punches, and electromagnetic means for controlling said clutch mechanism.

2. A recording apparatus of the type described, including in combination, an actuating-drum, a punch-mechanism including independently operable punches and a tape-feeding mechanism, gear trains interposed between said actuating-drum and said punch and feeding-mechanisms, a clutch mechanism coactively associated with said punch-mechanism and providing means for the selective actuation of its punches, electromagnetic means for tripping said clutch mechanism, and stop means for controlling the actuation of the tape-feeding mechanism.

3. A recording apparatus of the type described, including in combination, an actuating-drum, gear trains actuated thereby a duplex punch-mechanism including independently operable punches and a tape-feeding mechanism, said gear trains operatively connecting said punch and tape-feeding mechanism, a clutch mechanism associated with said punch-mechanism gear train and having means for engaging said punches to cause the simultaneous or selective actuation thereof; means for feeding the tape to the punches and means for controlling said feeding means, and electromagnetic means for tripping said clutch mechanism.

4. A recording apparatus of the type described, including in combination, an actuating-drum embodying a spring and reversely movable sections, a punch-mechanism and a tape-feeding mechanism coactively associated with said drum sections, a clutch mechanism coactively associated with said punch-mechanism and providing means for the synchronous actuation of the punches, and electromagnetic means for tripping said clutch mechanism.

5. A recording apparatus of the type described, including in combination, an actuating-drum embodying a spring and reversely movable sections, a punch-mechanism coactively associated with one of said drum sections and a tape-feeding mechanism coactively associated with the other of said sections, a clutch mechanism coactively associated with said punch-mechanism and providing means for the selective or simultaneous contacting of the punches, electrically operated means for tripping said clutch mechanism, and means associated with said clutch mechanism to simultaneously release its correlated drum section to cause the actuation of said punches to perforate the tape.

6. A recording apparatus of the type described, including in combination, an actuating-drum embodying a spring and reversely movable sections forming a housing, a punch-mechanism and a tape-feeding mechanism, a punch-mechanism gear train connecting one of said drum sections to the punch-mechanism and a tape-feeding gear train connecting the other of said sections to the tape-feed mechanism, a clutch mechanism included in said punch-mechanism gear train and having means for contacting the punches of said punch-mechanism, means associated with said clutch mechanism to release its correlated drum-section to cause the functioning thereof to drive said clutch mechanism, and electrically-controlled means for causing the simultaneous tripping of the clutch mechanism to cause the functioning of the punches to punch the moving tape.

7. A recording apparatus of the type described, including in combination, an actuating-drum embodying a spring and reversely movable sections forming a housing, a punch-mechanism and a tape-feeding mechanism, said punch-mechanism consisting of duplicate punches adapted to selectively or simultaneously contact the tape, a gear train connecting one of said drum sections to the punch-mechanism and a gear train connecting the other of said sections to the tape-feed, a clutch mechanism included in said punch-mechanism train and having means for contacting the punches of said punch-mechanism, means associated with said clutch mechanism to release its correlated drum-section to cause the functioning thereof to drive said clutch mechanism, and electrically-controlled means for causing the simultaneous tripping of the clutch mechanism to cause the functioning of the punches to punch the moving tape.

8. A recording apparatus of the type described, including in combination, an actuating-drum embodying a spring and reversely movable sections forming a housing, a punch-mechanism and a tape-feeding mechanism, said punch mechanism consisting of duplicate punches adapted to selectively or simultaneously contact the tape, a gear train connecting one of said drum sections to the punch-mechanism and a gear train connecting the other of said sections to the tape-feed, a clutch mechanism included in said punch-mechanism train and having duplicate hammer-mechanisms adapted to contact the punches of said punch-mechanism; means associated with said clutch mechanism to release its correlated drum-section to cause the functioning thereof to drive said clutch mechanism, and electrically-controlled means for causing the simultaneous tripping of the clutch mechanism to cause the functioning of the punches to punch the moving tape.

9. A recording apparatus of the type described, including in combination, an actuating-drum embodying a spring and reversely movable sections forming a housing, a punch-mechanism and a tape-feeding mechanism, said punch-mechanism consisting of duplicate punches adapted to selectively or simultaneously contact the tape, a gear train connecting one of said drum sections to the punch-mechanism and a gear train connecting the other of said sections to the tape-feed, a clutch mechanism included in said punch-mechanism train and having duplicate hammer mechanisms adapted to contact the punches of said punch-mechanism, said hammer-mechanisms being laterally movable independent of each other; means associated with said clutch mechanism to release its correlated drum-section to cause the functioning thereof to drive said clutch mechanism, and electrically - controlled means for causing the simultaneous tripping of the clutch mechanism to cause the functioning of the punches to punch the moving tape.

10. A recording apparatus of the type described, including in combination, an actuating-drum embodying a spring and reversely movable sections forming a housing, a punch-mechanism and a tape-feeding mechanism coactively associated therewith, said punch-mechanism consisting of duplicate punches contiguously arranged and adapted to selectively or simultaneously contact the tape, gear means connecting one of said drum-sections to the punch-mechanism and gear means connecting the other of said sections to the tape-feed, a clutch mechanism included in said punch-mechanism gear means and having duplicate hammer-mechanisms adapted to selectively or simultaneously contact the punches of said punch-mechanism; means associated with said clutch-mechanism for locking its correlated drum-section against movement and means for releasing said drum-section to cause the functioning thereof to drive said clutch mechanism, and electrically-controlled means for tripping said clutch mechanism to cause the functioning of the punches.

11. A recording apparatus of the type described, including in combination, an actuating-drum embodying a spring and reversely movable sections, a punch-mechanism and a tape-feeding mechanism coactively associated therewith, said punch-mechanism consisting of duplicate punches contiguously arranged, spring means carried by said punches and adapted to hold said punches normally retracted, gear means connecting one of said drum-sections to the punch-mechanism and gear means connecting the other of said sections to the tape-feeding mechanism, a clutch included in said punch-mechanism and consisting of a rigid shaft carrying a ratchet gear and duplicate hammer-mechanisms laterally movable respective to each other and adapted for selective or simultaneous engagement with said ratchet gear, means associated with said clutch mechanism for locking its correlated drum-section against movement, means actuated by said clutch for releasing said locking means and its drum-section to cause the functioning thereof to drive said clutch mechanism, and electrically-controlled means for the tripping of said clutch mechanism.

12. A recording apparatus of the type described, including in combination, an actuating-drum embodying a spring and reversely movable sections, a punch-mechanism and a tape-feeding mechanism coactively associated therewith, said punch-mechanism consisting of duplicate punches contiguously arranged, spring means carried by said punches and adapted to hold the latter normally retracted, gear means connecting one of said drum-sections to the punch-mechanism and gear means connecting the other of said sections to the tape-feeding mechanism, a clutch included in said punch-mechanism gear means and consisting of a rigid shaft carrying a ratchet gear and duplicate hammer-mechanisms laterally movable respective to each other and adapted for selective or simultaneous engagement with said ratchet gear, means associated with said clutch-mechanism for locking its correlated drum-section against movement and means actuated by said clutch for releasing said locking means and its drum-section to cause the functioning thereof to drive said clutch mechanism; means for governing the movement of the tape-feeding mechanism, and electrically-controlled means for the tripping of said clutch mechanism.

13. A recording apparatus of the type described, including in combination, a base and upstanding side plates forming a supporting frame, an actuating-drum mounted in said supporting frame and embodying a spring and reversely movable sections, a punch-mechanism and a tape-feeding mechanism coactively associated therewith, said punch-mechanism consisting of duplicate punches contiguously arranged, spring means carried by said punches and adapted to hold the latter normally retracted, gear means connecting one of said drum-sections to the tape-feeding mechanism and gear means connecting the other drum section to the punch-mechanism, a clutch included in said punch-mechanism gear means and consisting of a rigid shaft carrying a gear having opposed and angularly-arranged ratchet teeth, duplicate hammer-mechanisms having pawl members laterally movable respective to each other and adapted for selective or simultaneous engagement with said ratchet teeth; means associated with said clutch mechanism for locking its correlated drum-section against movement and means actuated by said clutch for releasing said locking means and its drum-section to cause the functioning of said drum-section to drive the clutch mechanism, and electrically-controlled means for the tripping of said clutch mechanism.

14. In a recording apparatus of the class described, the combination with a punch-mechanism and a coactively associated clutch mechanism, spring actuating-means for driving said punch-mechanism, said punch-mechanism embodying duplex punches arranged to function independently of each other or simultaneously; said clutch mechanism consisting of a rigidly-mounted shaft having oppositely-disposed clutch bearing-sleeves slidably mounted thereon, a loosely-mounted gear wheel interposed between said sleeves and having annularly and oppositely-disposed ratchet teeth arranged thereon, radially-arranged pawls carried by said sleeves and adapted to engage said ratchet teeth, spring means tending to urge said pawls into engagement with said ratchet teeth, clutch means acting in opposition to said spring means and adapted to lock said pawls in retracted positions, and means for selectively tripping said clutch means to cause the inward movement of said sleeves and the consequent engagement of said pawls with said ratchet teeth.

15. In a recording apparatus of the class described, the combination with a punch-mechanism and a coactively associated clutch mechanism, spring actuating-means for actuating said punch-mechanism, said punch-mechanism embodying duplex punches arranged to function independently or simultaneously, said clutch mechanism consisting of a rigidly-mounted shaft having oppositely-disposed clutch bearing-sleeves adapted for lateral sliding movement upon said shaft, a loosely-mounted gear wheel interposed between said sleeves and having opposite sets of annularly-disposed ratchet teeth arranged thereon in a common direction, hammer-mechanisms integrally formed with said sleeves and having radially-arranged pawls adapted to engage said ratchet teeth; spring means tending to urge said hammer-mechanism pawls into engagement with said ratchet teeth, clutch means acting in opposition to said spring means and adapted to lock said hammer-mechanism in retracted positions, and electrically-controlled means for selectively tripping said clutches to cause the inward movement of said hammer-mechanisms to lock them together as a unit for rotation with said gear.

16. In a recording apparatus of the class described, the combination with a punch-mechanism and a coactively associated clutch mechanism embodying duplex punches arranged to function independently or simultaneously, said clutch mechanism consisting of a rigidly-mounted shaft having oppositely-disposed clutch bearing-sleeves adapted for lateral sliding movement upon said shaft, a loosely-mounted gear wheel interposed between said sleeves and having opposite sets of annularly-disposed ratchet teeth arranged thereon in a common directon, hammer-mechanisms integrally formed with said sleeves and having radially-arranged pawls adapted to engage said ratchet teeth, spring means tending to urge said hammer-mechanism pawls into engagement with said ratchet teeth, clutch means acting in opposition to said spring means and adapted to lock said hammer-mechanism in retracted positions, and electrically-controlled means for selectively tripping said clutches to cause the inward movement of said hammer-mechanisms to lock them together as a unit for rotation with said gear throughout one-third of a revolution.

17. In a device of the class described, the combination with an actuating-drum, of a clutch mechanism, a drum tripping-mechanism coactively associated with said clutch-mechanism, a gear train between said actuating-drum and said clutch-mechanism, said drum tripping-mechanism consisting of a member having radially-arranged arms provided with stop lugs and an oscillatory link adapted to engage one of said stop lugs to prevent rotation of said gear train, and electrically-controlled means for simultaneously tripping said clutch-mechanism and said drum tripping-mechanism to cause the actuation of said actuating-drum.

18. In a device of the class described, the combination with a punch-mechanism, of electro-mechanical actuating means therefor, a tape-feeding mechanism, a tape carried by said mechanism; said punch-mechanism consisting of duplicate punches arranged to strike the tape at an angle, means for controlling said tape-feeding mechanism, and means including a hammer-mechanism for causing the selective or simultaneous actuation of said punches to cut substantially triangular openings in said tape.

19. In a device of the class described, the combination with a punch-mechanism, of electro-mechanical actuating means therefor, a tape-feeding mechanism, a continuous tape carried by said tape-feeding mechanism; said punch-mechanism being positioned adjacent the tape and consisting of duplicate punches angularly arranged relative thereto and independently operable relative to each other, and means including a hammer-mechanism for causing the actuation of said punches to perforate said tape.

20. In a device of the class described, the combination with a punch-mechanism, of electro-mechanical actuating means therefor, including a hammer-mechanism, a tape-feeding mechanism, a continuous tape carried by said tape-feeding mechanism; said punch-mechanism consisting of duplicate punches angularly arranged relative to the tape and adapted to strike said tape at an angular inclination, and means for tripping said hammer mechanism to cause the actuation of said punches.

21. In a device of the class described, the combination with a punch-mechanism, of electro-mechanical actuating means therefor including a hammer-mechanism, a tape-feeding mechanism, a continuous tape carried by said tape-feeding mechanism; said punch-mechanism consisting of duplicate punches angularly arranged relative to the tape and adapted to strike said tape at an angular inclination, spring means adapted to normally retract said punches, and means for tripping said hammer-mechanism to cause the functioning of said punches to partially perforate the tape.

22. In apparatus of the character described, synchronously coactive punch and tape feeding mechanisms, said punch mechanism comprising a plurality of punches adapted to selectively or simultaneously contact the tape, a clutch mechanism included in said punch mechanism and having normally static hammers adapted for movement to contact said punches for operating the same, and means for actuating said clutch mechanism to cause the selective functioning of said hammers.

23. In apparatus of the character described, synchronously coactive punch and tape feeding mechanisms, said punch mechanism comprising a plurality of punches adapted to selectively or simultaneously contact the tape, a clutch mechanism included in said punch mechanism and having normally static hammers adapted to contact said punches for operating the same, and electromagnetic means for actuating said clutch mechanism to cause a selective functioning of said hammers against said punches.

24. In a device of the character described, a punch mechanism including independently operable punches, a tape-feeding mechanism, means for synchronously operating said mechanisms, means normally operative to prevent the functioning of said operating means, a normally inoperative clutch mechanism coactively associated with said punch mechanism and providing means for the selective or simultaneous actuation of its punches, and means simultaneously actuable to render said clutch and said first means operative.

25. In a device of the character described, a punch mechanism, a tape-feeding mechanism, means for synchronously operating said mechanisms, means normally operative to prevent the functioning of said operating means, a clutch mechanism coactively associated with said punch mechanism, and a member normally cooperating with said clutch mechanism to render the same inoperative and arranged upon its inoperative disposition to permit an engagement of the clutch and substantially simultaneously render said operating means operative.

26. In apparatus of the character described, independently operable and normally retracted tape-marking members, a hammer mechanism including normally static hammers for operating said members, and a clutch mechanism coactively associated with said hammers and providing means for the selective or simultaneous actuation of said hammers against said members to mark a tape.

27. In apparatus of the character described, independently operable and normally retracted tape-marking members, a hammer mechanism including normally static hammers for operation against said members, a tape-feeding mechanism, means for synchronously operating said mechanisms, and a clutch mechanism in said hammer mechanism for the selective or simultaneous actuation of said hammers against said tape-marking members to mark a tape.

28. In a device of the character described, independently operable punches, a punch-actuating mechanism, a tape-feeding mechanism, a common means for synchronously operating said mechanisms, means normally operative to prevent the functioning of said operating means, a normally inoperative clutch mechanism coactively associated with said operating means and punch-actuating mechanism for the selective or simultaneous actuation of said punches against a tape, and means actuatable to simultaneously render said operating means and clutch operative.

29. In a device of the character described, a tape-marking member, actuating mechanism for said member, means for operating said mechanism, means normally operative to prevent the functioning of said operating means, a normally inoperative clutch mechanism coactively associated with said operating means and said punch-actuating member, and means actuatable to simultaneously render said operating means and clutch operative.

In testimony whereof, I affix my signature.

OSWALD G. STEINITZ.